April 27, 1937.  J. D. MacLAURY  2,078,865
HAND KNOB
Filed Feb. 26, 1936
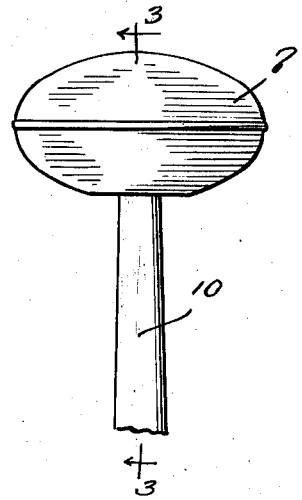
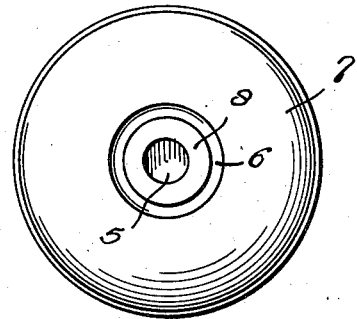
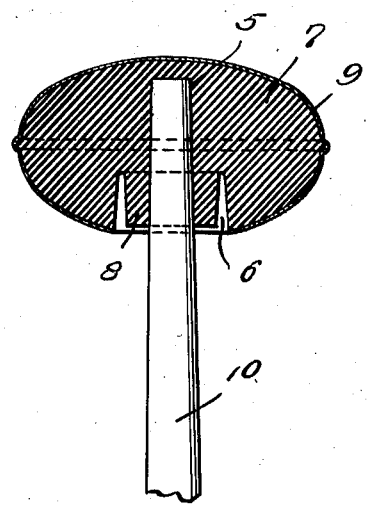
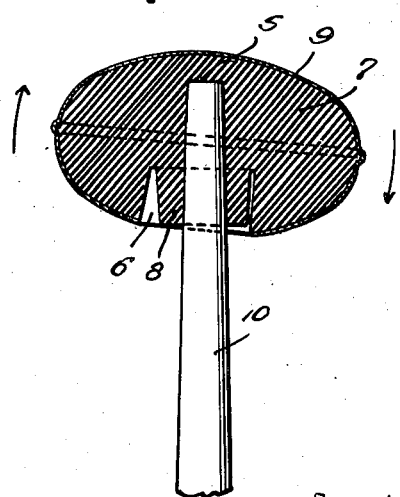
Inventor
John D. MacLaury,
By J. Stanley Burch
Attorney Patented Apr. 27, 1937

2,078,865

UNITED STATES PATENT OFFICE 2,078,865

HAND KNOB

John D. MacLaury, Oberlin, Ohio

Application February 26, 1936, Serial No. 65,884

7 Claims. (Cl. 16—121)

This invention relates to hand knobs for automobile gear shift levers and the like, and has more particular reference to an improved knob of that kind molded of soft or yieldable rubber.

Heretofore, it has not been considered practical to mold hand knobs for automobile gear shift levers entirely of soft or yieldable rubber, for the reason that if such a hand knob is provided with a desirable hard and brittle or inelastic finishing coating, such finishing coating will crack or craze by reason of distortion of the surface of the knob in use. Obviously, a hand knob molded of soft rubber and not provided with a finishing coating is not attractive or satisfactory because it will not take a high polish and will have a dull and unattractive finish.

An object of the present invention, therefore, is to provide a hand knob for gear shift levers molded entirely of soft or yieldable rubber and so constructed that it may be provided with a hard and brittle semi-elastic or inelastic finishing coating of an attractive kind, without any danger of said finishing coating cracking or crazing from surface distortion of the knob under ordinary conditions of use.

Another object of the present invention is to so construct a soft rubber hand knob of the above kind that it may be securely connected to a gear shift lever without the use of a screw threaded metal insert or other metal part, and without special formation of the upper end of the gear shift lever.

Further objects and advantages of the present invention will become apparent from the following description when considered in connection with the accompanying drawing, in which:

Figure 1 is a fragmentary elevational view of a gear shift lever equipped with a hand knob embodying the present invention.

Figure 2 is a bottom plan view of the knob shown in Figure 1, detached from the gear shift lever.

Figure 3 is a vertical section on line 3—3 of Figure 1; and

Figure 4 is a view somewhat similar to Figure 3, illustrating the manner in which the main or major outer portion of the knob is permitted to yield or flex universally relative to the axial stem and adjacent central portion of the knob, and relative to the gear shift lever, for avoiding surface distortion of the knob and cracking or crazing of its finishing coating.

Referring more in detail to the drawing, the present hand knob is preferably in the form of a flattened spheroid and molded entirely of soft or yieldable rubber. This molded body is provided with an axial cylindrical socket or recess 5 that opens through the bottom of the body or knob and is relatively deep so as to extend upwardly into somewhat close proximity to the upper surface of the body or knob.

As shown more clearly in Figures 2 to 4 inclusive, the molded body is further provided in its under side with a fairly deep annular recess or groove 6 in spaced concentric relation to and surrounding the axial socket or recess 5, so as to provide the body with a main or major outer portion 7 and an inner axial stem portion 8 at the bottom of the knob or knob body. For a purpose which will presently be described, the lower end of the step portion 8 terminates slightly above the lowermost portion of the bottom surface of the main portion 7 of the knob, immediately adjacent the annular recess or groove 6. The surface of the main portion 7 is provided with any desired attractive hard and brittle semi-elastic or inelastic finishing coating 9, and this finishing coating may be opaque, transparent, or in bright colors.

In practice, the axial socket or recess 5 is made of a diameter slightly less than the diameter of the upper end of most conventional plain or threaded gear shift levers. Thus, when the knob is forced onto the gear shift lever, the wall of socket 5 will tightly grip the upper end of said lever and, aided by the suction effect which is obviously had, the knob is securely retained on the upper end of the gear shift lever without the use of threaded metal inserts or other metal parts or without special formation of the upper end of the gear shift lever to provide for mechanical interengagement of the knob and said lever. A very pronounced suction effect is had due to the relatively deep nature of the axial socket 5, and it will be noted that said socket 5 is provided in the body of the knob proper, and no depending elongated attaching stem is necessary. As the knob is made entirely of soft or yieldable rubber, it is obvious that sufficient expansion will take place to permit insertion in the axial socket 5 of the upper end of gear shift levers which vary in sizes or diameters within reasonable limits, and without causing such distortion of the knob as might result in cracking or crazing of the finishing coating 9.

In practice, the upper end of lever 10 is inserted in the axial socket 5 as shown in Figures 3 and 4 to secure a suction effect in the attachment of the knob to the lever. As the annular recess or groove 6 is relatively wide, the axial stem portion 8 is permitted to yield laterally in all directions to a material or pronounced extent relative to the main or major outer portion 7 of the knob. This allows substantially universal yielding of the main portion 7 of the knob relative to the lever 10, the stem portion 7 and the central portion of the knob immediately adjacent the stem 8, so that such yielding causes no surface distortion of the knob such as will cause the finishing coating 9 to crack or craze. Also, due to the fact that the lower end of the stem portion 8 terminates slightly above the portion of the bottom surface of the knob immediately surrounding the annular recess 6, the lower end of said stem portion 8 will strike the portion 7 above the applied finishing coating 9 within the annular recess 6 as shown in Figure 4, when the main portion 7 of the knob and the stem portion 8 are relatively flexed. This provides additional security against surface distortion or contact such as might cause the finishing coating 9 to crack or craze. Moreover, the expansion of socket 5, when the upper end of lever 10 is forced into the same, is not transmitted to the outer surface of portion 7 because of the provision of the annular recess 6, thus avoiding such surface distortion as might cause the finishing coating 9 to crack or craze when the knob is placed on the lever 10. It will thus be seen that the annular groove or recess 6 is in the nature of a distortion relief and strain relief groove.

A knob constructed in accordance with the present invention possesses many advantages. Among these are the fact that relatively cheap and inexpensive material is used as compared with commonly used bakelite and other phenolic compositions, and that the knob made entirely of soft or yieldable rubber minimizes transmission of vibrations and shocks from the gear shift lever to the hand grasping the knob.

From the foregoing description, it is believed that the construction, and operation, as well as the advantages of the present invention, will be readily understood and appreciated by those skilled in the art.

What I claim as new is:

1. A hand knob for a gear shift lever comprising a body molded entirely of yieldable rubber and with a relatively deep axial cylindrical socket adapted to frictionally receive an unenlarged or unshouldered upper end of a gear shift lever, said body being further formed in the bottom thereof with a relatively deep annular recess in spaced concentric relation to and surrounding the lower portion of said axial socket, whereby the knob is provided with a main outer portion universally yieldable relative to said lever and the portion of the knob inwardly of said annular recess.

2. A hand knob for a gear shift lever, comprising a body molded entirely of yieldable rubber, said body being provided with an axial socket to receive the upper end of the gear shift lever and being formed in the bottom thereof with an annular recess in spaced concentric relation to the lower portion of said axial socket so as to provide the body with a major outer portion and an inner axial stem portion universally yieldable relative to each other.

3. A hand knob for a gear shift lever, comprising a body molded entirely of yieldable rubber, said body being provided with an axial socket to receive the upper end of the gear shift lever and being formed in the bottom thereof with an annular recess in spaced concentric relation to the lower portion of said axial socket so as to provide the body with a major outer portion and an inner axial stem portion universally yieldable relative to each other, and a substantially inelastic finishing coating applied on the surface of said major outer portion of the body.

4. A hand knob for a gear shift lever, comprising a body molded entirely of yieldable rubber, said body being provided with an axial socket to receive the upper end of the gear shift lever and being formed in the bottom thereof with an annular recess in spaced concentric relation to the lower portion of said axial socket so as to provide the body with a major outer portion and an inner axial stem portion universally yieldable relative to each other, and a substantially inelastic finishing coating applied on the surface of said major outer portion of the body, said axial stem portion having its lower end terminating above the bottom surface of the major outer portion of the body immediately surrounding said annular recess.

5. A hand knob for a gear shift lever, comprising a body molded entirely of yieldable rubber, said body being provided with an axial socket to receive the upper end of the gear shift lever and being formed in the bottom thereof with an annular recess in spaced concentric relation to the lower portion of said axial socket so as to provide the body with a major outer portion and an inner axial stem portion universally yieldable relative to each other, said axial socket being relatively deep and of cylindrical form for retaining reception of the lever through the mere action of friction and suction.

6. A hand knob for a gear shift lever molded entirely of yieldable rubber in the form of a flattened spheroid, said knob being provided with a relatively deep axial socket that opens through the bottom of the knob for frictional reception of the upper end of the gear shift lever, said knob further being provided with a relatively deep annular recess in the bottom thereof and in spaced concentric relation to and surrounding said axial socket so as to provide the knob with a major outer portion and an inner and bottom axial stem portion capable of substantially universal relative yielding.

7. A hand knob for a gear shift lever molded entirely of yieldable rubber in the form of a flattened spheroid, said knob being provided with a relatively deep axial socket that opens through the bottom of the knob for frictional reception of the upper end of the gear shift lever, said knob further being provided with a relatively deep annular recess in the bottom thereof and in spaced concentric relation to and surrounding said axial socket so as to provide the knob with a major outer portion and an inner and bottom axial stem portion capable of substantially universal relative yielding, and a substantially inelastic finishing coating on the surface of said main outer portion, said inner axial stem portion terminating at its lower end above the surrounding bottom portion of the surface of said major outer portion of the knob.

JOHN D. MacLAURY.